F. S. BALDWIN.
Calculating-Machine.

No. 159,244.    Patented Feb. 2, 1875.

4 Sheets--Sheet 1.

Witnesses: Thomas McIlvain, John K. Rupertus

Frank S. Baldwin
by his Attys. Howson and Son

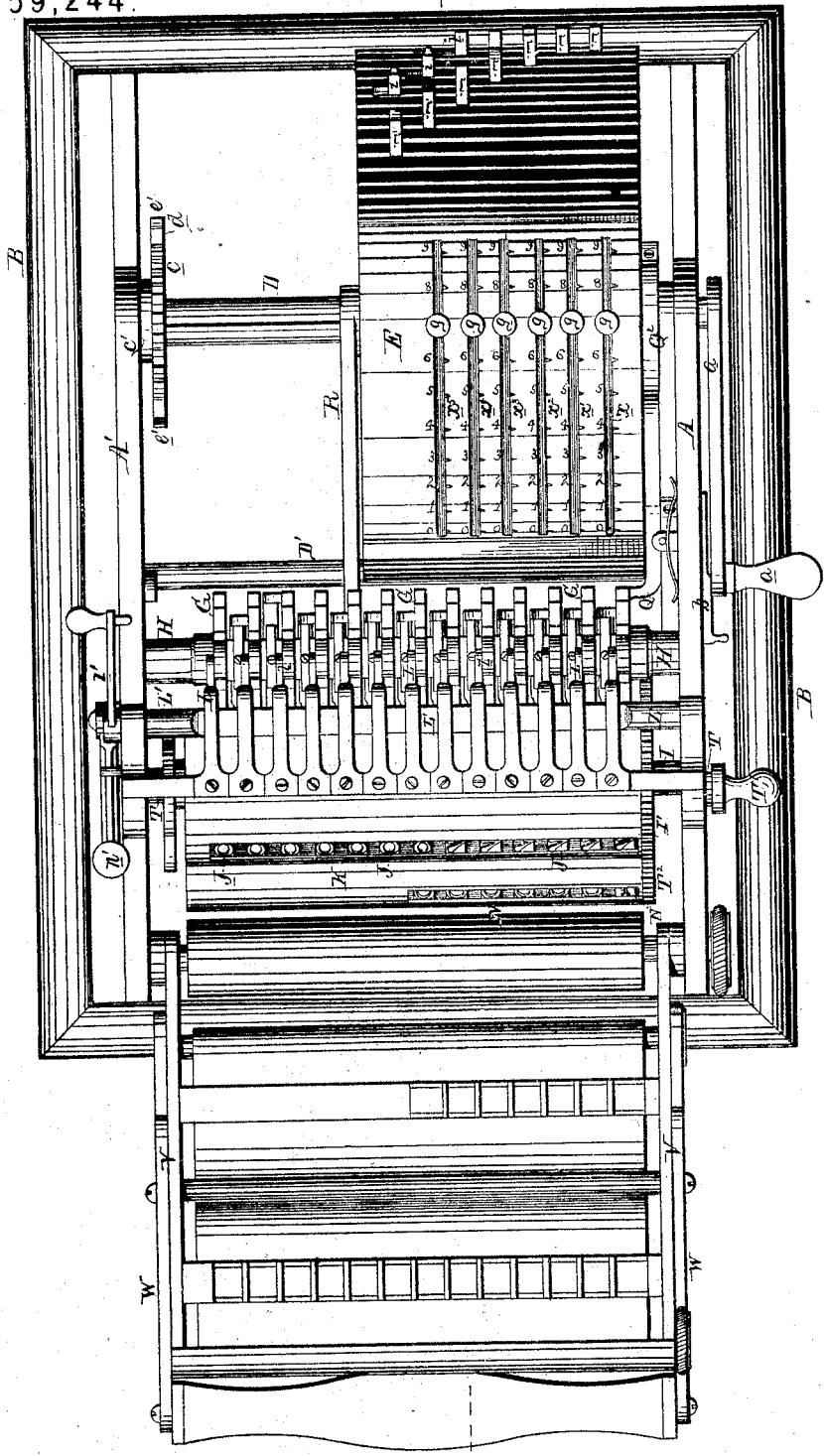

F. S. BALDWIN.
Calculating-Machine.

No. 159,244.

Patented Feb. 2, 1875.

4 Sheets--Sheet 3.

Witnesses,
Thomas McIlvain
John K. Rupertus

Frank S. Baldwin
by his Attys.
Hinsdale & Son

THE GRAPHIC CO. PHOTO-LITH. 39 & 41 PARK PLACE, N.Y.

F. S. BALDWIN.
Calculating-Machine.

No. 159,244. Patented Feb. 2, 1875.

Witnesses,
Thomas McIlvain
John K. Ruperteus

Frank S. Baldwin
by his Att'y
Hewson and Son

UNITED STATES PATENT OFFICE.

FRANK S. BALDWIN, OF ST. LOUIS, MISSOURI.

IMPROVEMENT IN CALCULATING-MACHINES.

Specification forming part of Letters Patent No. 159,244, dated February 2, 1875; application filed September 8, 1873.

*To all whom it may concern:*

Be it known that I, FRANK S. BALDWIN, of the city and county of St. Louis, State of Missouri, have invented an Improved Calculating-Machine, of which the following is a specification:

The object of my invention is to facilitate the making of complex calculations; and this object I attain by the use of the machine which I will now proceed to describe, reference being had to the accompanying drawing, in which—

Figure 1:
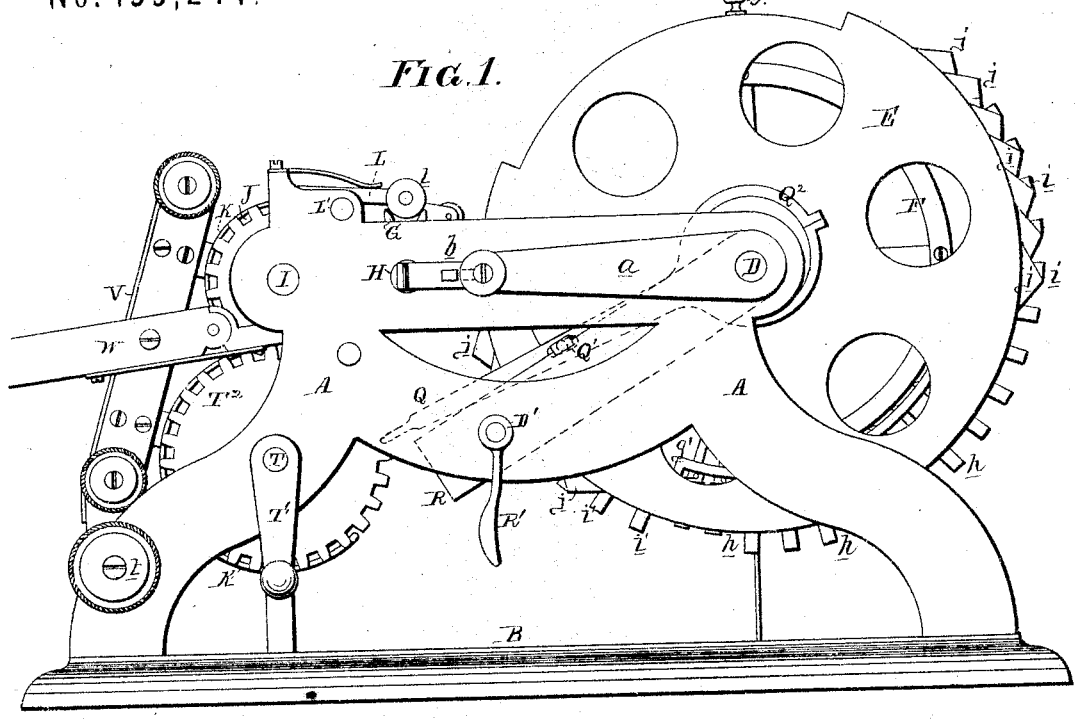
Figure 3:
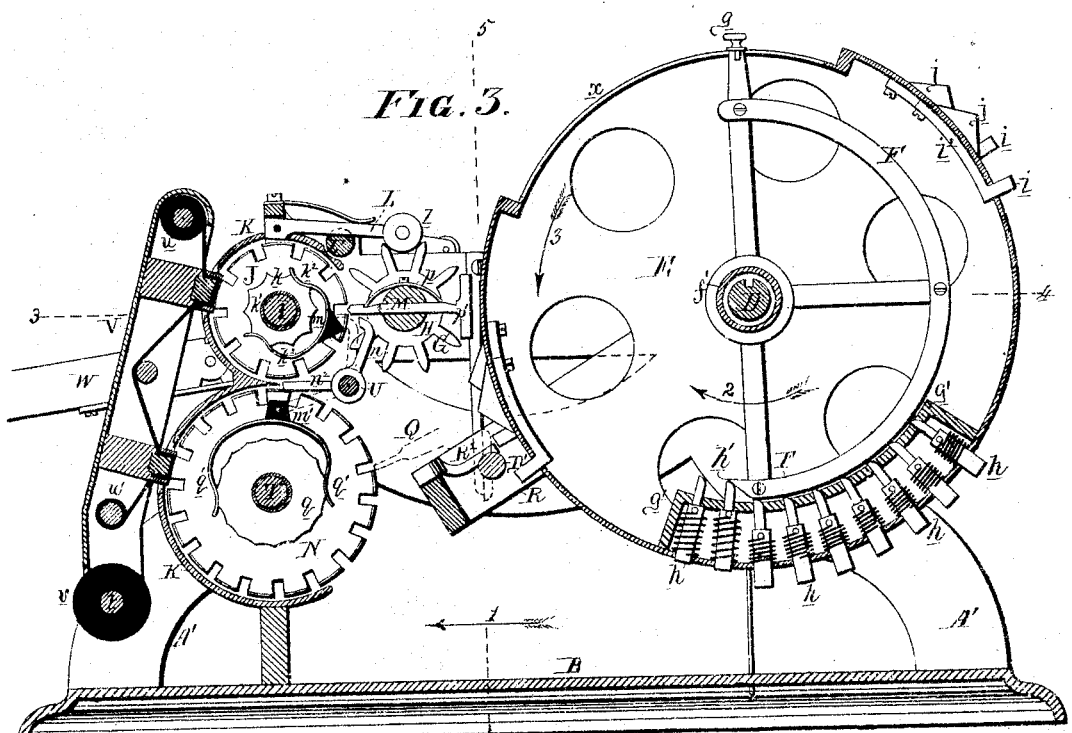
Figure 4:
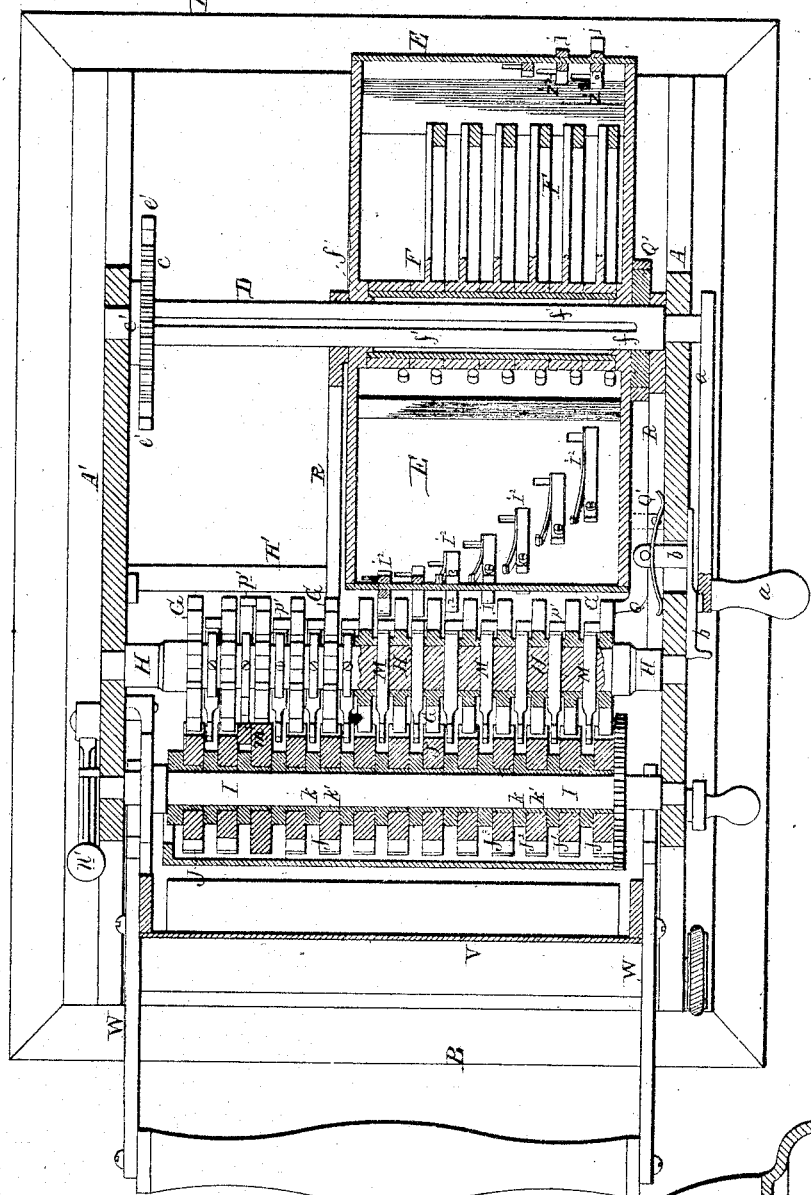
Figure 6:
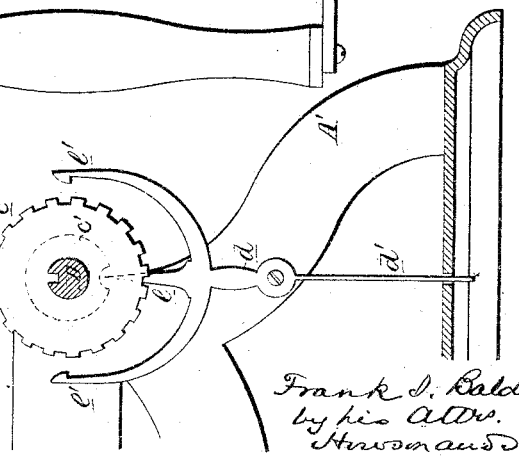
Figure 5:
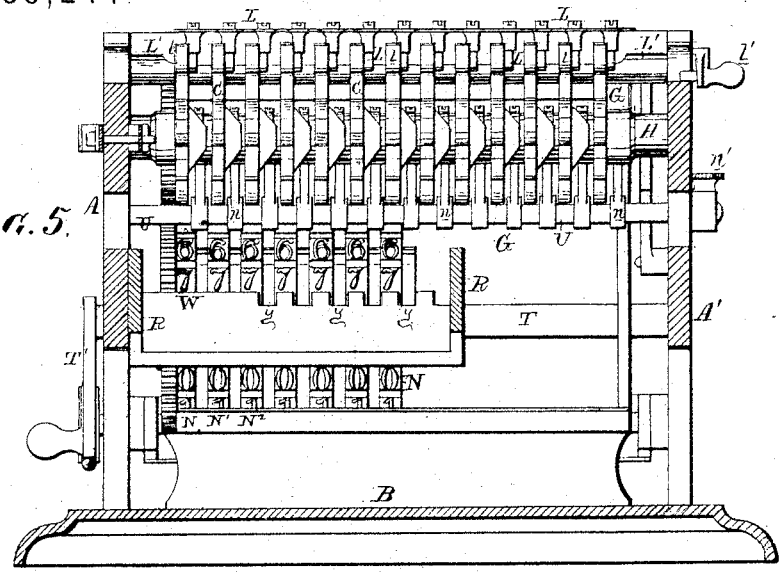

Figure 1, Sheet 1, is a side elevation of my improved calculating-machine; Fig. 2, Sheet 2, a plan view; Fig. 3, Sheet 1, a sectional elevation on the line 1 2, Fig. 2; Fig. 4, Sheet 3, a sectional plan on the line 3 4, Fig. 3; Fig. 5, Sheet 4, a transverse sectional elevation on the line 5 6, Fig. 3, looking in the direction of the arrow 1; Figs. 6, 7, 8, and 9, detached views of parts of the machine.

The opposite side frames A and A′ of the machine are secured to a bed-plate, B, and in suitable bearings in the same turns a shaft, D, provided at one end with an operating-crank, a, and carrying a cylinder, E, capable of sliding upon, without turning independently of, the said shaft. (See Figs. 1, 2, and 3.) A spring-slide, b, secured to the side frame A, is adapted to a groove in the crank a, and, when thrust into the same, serves to lock the said crank, and consequently the shaft D and cylinder, in the position shown in Figs. 1 and 2. The cylinder can be turned in either direction by the crank, but the movement must commence when the parts are in about the position shown in Figs. 1, 2, and 3, and a complete revolution must be made before the direction of said movement can be reversed, this being insured by the device illustrated in Fig. 6, which consists of a ratchet or cog wheel, c, and notched disk c′, secured to the shaft D, and of an anchor-lever, d, hung to the side frame A′. The lever is acted on by a spring, d′, tending to maintain it in the position shown, and when in this position the outer extremity of an arm, e, of the said lever is contained within the notch of the disk c′. When the shaft and disk are turned in either direction the arm e will be forced out of the notch and against the plain portion of the edge of the disk, which will vibrate the lever sufficiently to cause one or other of its hooked arms or pawls e′ to engage with the teeth of the wheel c, and to prevent any reverse movement of the same, or of the shaft and cylinder, until a complete revolution has been made. The cylinder E bears upon the shaft at its opposite ends only, where it is provided with hubs f, (see Fig. 4,) and to bosses on these hubs, within the cylinder, are fitted the opposite ends of a sleeve, f′, which is free from contact with the shaft, thus considerably reducing the friction in sliding the cylinder upon the said shaft, as hereafter described, and which forms a bearing for a number of adjustable segments, F, each capable of being freely turned in either direction upon the said sleeve to an extent determined by the length of the slot $x$ in the cylinder, through which its operating-knob $g$ passes. (See Figs. 2 and 3.) Directly opposite each segment F, and adapted to bearings in the curved face of the cylinder, and in a segmental partition, $g'$, is a row of advancing and retracting cog-teeth, h, each acted on by a spring tending to draw it inward, and arranged to be forced outward by a cam-like incline, h′, at the inner end of the segment F, when the latter is turned in the direction of the arrow 2, Fig. 3, the plain curved portion of the said segment bearing against and holding the teeth after their outward adjustment. There are, in the present instance, six segments, F, six rows of teeth, h, and six slots, $x$, in the cylinder, for the passage of the operating-knobs $g$; and on one edge of each of the said slots $x$, at equal distances apart, are a series of notches, numbered from 0 to 9, inclusive, which the V-shaped edges of the shanks of the operating-knobs $g$, acted on by springs, have a constant tendency to enter. There are nine cog-teeth, h, in each row, and the adjustment of the knob $g$ to any given numbered notch indicates that a corresponding number of teeth have been advanced by a like adjustment of the segment. For instance, the adjustment of the several knobs to the notches 7, as shown in Fig. 2, indicates that the first seven teeth in each row are advanced, which is seen to be the case in Fig. 3.

For every row of teeth, h, on the cylinder, and at opposite ends of the said rows, are two additional teeth, $i$ and $i^1$, each of which projects through a slot in the cylinder, and is secured to or forms part of a curved arm, $i^2$, hung to the interior curved surface of the cylinder, and acted on by a spring, which tends to constantly maintain the said tooth in a position midway between the rows of teeth $h$, the lateral adjustment of the said tooth, however, which is effected in the manner hereafter described, bringing it opposite the end of the row of teeth $h$ next that to which it belongs. (See Figs. 2, 3, and 4.)

The teeth $i$ and $i^1$ are arranged diagonally, in respect to each other, on the face of the cylinder; and upon the latter, in line with the said teeth $i^1$ and $i^2$, and also midway between the rows of teeth $h$, are a series of double-inclined projections, $j$, for a purpose described hereafter.

The teeth on the cylinder gear into a series of intermediate wheels, G, arranged to turn loosely and independently of each other on a fixed shaft, H, and these in turn transmit movement to a series of cog-wheels, J, of ten teeth each, each of which turns independently of the others upon the hub $k^1$ of a disk, $k$, keyed to a shaft, I, which is adapted to suitable bearings in the opposite side frames of the machine. (See Figs. 3 and 4.)

Upon the ten teeth of each of the wheels J are raised numbers or type from 0 to 9, inclusive, which can be viewed through a slot in the casing K, partially surrounding said wheels.

The accidental turning of the several wheels G is prevented by a series of yielding spring-arms, L, hung to the fixed frame, and each provided at its outer end with a roller, $l$, which rests between two of the teeth of each of the said wheels, as shown in Figs. 2 and 3, and the whole of the said arms may be raised simultaneously, in order to free the wheels, by means of a cam-shaft, L', extending beneath the same, turning in suitable bearings in the opposite side frames, and provided at one end with an operating-crank, $l'$. (See Figs. 2, 3, and 5.)

The accidental turning of the type-wheels J is prevented indirectly by the above-described spring-arms L, and directly by a bow-spring, $k^2$, secured to a triangular projection, $m$, with which each wheel is provided, and arranged to bear with its opposite ends against the recessed edge of the disk $k$ of the said wheel.

There are ten recesses on the edge of each disk, corresponding with the number of teeth on the wheels, and the said recesses are of sufficient depth to retain the ends of the spring, and thus prevent accidental movement of its wheel; but the ends of the spring can pass from one recess to another, and thus permit the wheel to be turned by the exercise of a slight effort.

The triangular projections $m$, which are secured to one side of each of the type-wheels, serve two other distinct purposes besides that of sustaining the spring $k^2$, and are special features of my invention.

The second duty of the said triangular projections is to act as cams in forcing a series of rods, M, toward the cylinder E once for every complete revolution of their type-wheels J, the said projections $m$ being fixed to the wheels in such position that this movement of the rods shall be caused by the same just as the number 9 is visible through the slot in the casing K, the object of which will be rendered apparent hereafter.

The third duty of the said triangular projections is to serve as stops for their respective type-wheels by striking against a series of arms, $n$, on a rock-shaft, U, having its bearings in the opposite side frames, the said arms being turned into the paths of the triangular projections, as indicated by dotted lines in Fig. 3, by the pressure of the thumb or finger upon an operating handle or crank, $n^1$, with which the said shaft is provided at one end, and being restored to the position shown by full lines by the action of a spring when the pressure upon said handle is relieved. (See Figs. 2, 3, and 5.)

The rods M above referred to extend between the several wheels G, and through slots formed for their reception and guidance in the fixed shaft H, springs $p$, secured to the latter, being adapted to notches in the rods, and thus determining the extent of their movement. (See Fig. 3.) Each rod M, at the end adjacent to the cylinder, has a double-beveled enlargement or head, $p'$, (best observed in Figs. 3, 4, and 5,) the said head, when the rod is forced outward by the projection $m$, being directly in the path of one of the teeth, $i$ or $i^1$, of the cylinder, and serving, by its beveled surface, to adjust the same laterally to a position between the teeth of one of the intermediate wheels G, and after having performed this duty the rod M is forced back to its original position by the pressure against the same of one of the double-inclined projections $j$ of the cylinder. Directly beneath the type-wheels J are a series of larger type-wheels, N, hung loosely to a shaft, T, which has its bearings in the opposite side frames, is provided with an operating-crank, $T^1$, and has a cog-wheel, $T^2$, near one end, gearing into a wheel, I', on the shaft I of the type-wheels J. (See Figs. 2, 3, and 5.) The arrangement of the type-wheels N is precisely similar to that of the wheels J, each turning loosely upon the hub of a disk, $q$, keyed to the shaft, and each being so held by a bow-spring, $q'$, adapted to recesses on the edge of the disk as to require a slight effort to turn it. The disk $q$ has as many recesses on its edge as the type-wheel has teeth, and the spring $q'$ is secured to a block, $m'$, with which each wheel is provided, and is arranged to bear upon the disk $q$ of the said wheel. (See Fig. 3.) The blocks $m'$ also serve as stops to limit the movement of their respective type-wheels under the circumstances described hereafter, the stoppage being effected simultaneously with that of the wheels $J^1$ by arms $n^2$ on the rock-shaft U, which are turned into the paths of the said blocks $m'$, as indicated by dotted lines in Fig. 3. The wheels N are each provided with eighteen teeth, upon which are formed raised numbers or type, commencing at 0 at one side of the wheel, and running in both directions to 9 at the opposite side, the object of which arrangement will be hereafter explained. The type-wheels N are operated one at a time by a lever, Q, Figs. 1 and 7, slotted at its fulcrum-point $Q^1$, and so operated by an eccentric, $Q^2$, on the cylinder-shaft D that a vibratory movement shall be imparted to its outer extremity sufficient to move the type-wheel N to the extent of one tooth during each revolution of the eccentric and cylinder, the direction of the movement of the type wheel depending upon that of the cylinder, while the position of the said cylinder upon its shaft determines which of the said type-wheels shall be operated by the lever.

It is necessary in shifting the cylinder upon its shaft that the adjustments shall be positive and to certain determined points, in order to bring the several sets of teeth of the said cylinder opposite the teeth of those of the wheels G, which it is required to operate, and to effect such adjustment various devices may be used, two of which are illustrated in the present instance.

In Figs. 1, 2, 3, 4, and 5 the cylinder is embraced by a yoke, R, which slides upon the shaft D, and upon a rock-spindle, D', adapted to bearings in the opposite side frames. The rock-spindle is acted on by a spring, and has an operating-arm, $R^1$, and an arm, $R^2$, adapted to any of a series of notches, $y$, Fig. 5, in the said yoke. The spring retains the arm $R^2$ in the notch into which it is fitted, and this determines the proper position of the cylinder in respect to the type-wheels, and prevents its accidental displacement.

Figure 8:
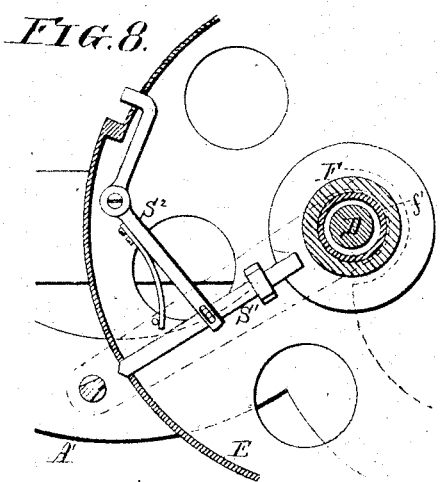
Figure 9:
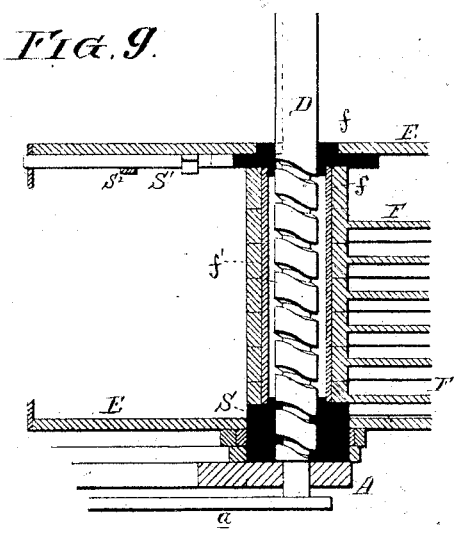
Figure 7:
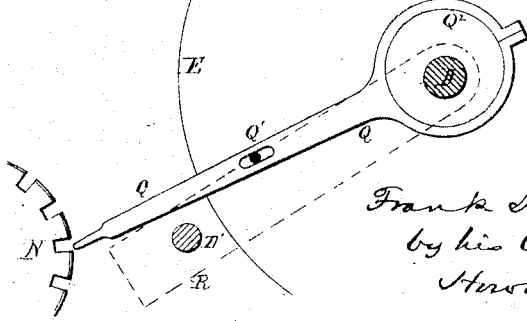

Another adjusting device, which I prefer to that above described, is illustrated in Figs. 8 and 9. In this case the shaft D has a screw-thread cut upon it, to which is adapted a nut, S, secured to or forming part of the cylinder, and the hub $f$ at the opposite end of the latter has a feather adapted to a groove in the shaft, so that it can slide upon, without turning independently of, the same. A bolt, $S^1$, operated by a spring-lever, $S^2$, serves to lock the hub $f$ to the cylinder under ordinary circumstances, and when this is the case the said cylinder must turn with the shaft D; but by withdrawing the bolt the said cylinder becomes loose upon the shaft, and can be adjusted upon the same by means of the screw and nut to the extent required, the thread being such that one turn of the shaft shifts the cylinder from one type-wheel to the next with perfect precision.

Before proceeding to describe the operation of the machine it will be necessary to explain that the first or lowermost graduated slot, $x$, in the cylinder, as seen in Fig. 2, indicates units, the next tens, the third hundreds, the fourth thousands, and so on, so that the total number indicated or set up by the knobs when adjusted to the position shown will be 777,777. The type-wheels J and N of the two sets also indicate units, tens, hundreds, &c., commencing at the same side of the machine as with the slots $x$.

I will now proceed to describe the operation of the parts in making a calculation of the simplest character, as, for instance, in adding the numbers 6 and 3 together. The knob $g$ of the unit-slot $x$ is first turned to the graduation 6, which will adjust the segment F sufficiently to advance six of the teeth $h$ of the unit row from the face of the cylinder. The cylinder is next turned to the extent of one complete revolution in the direction of the arrow 2, Fig. 3, the effect of which will be to turn the type-wheel J by means of the six advanced teeth $h$, and through the intermediate wheel G, to the extent of six teeth, and to consequently bring its number 6 opposite the slot in the casing. Three of the advanced teeth $h$ are next retracted by turning back the segment F until its knob $g$ is opposite the graduation 3 in the slot, after which the cylinder is turned once in the same direction as before. This will cause the units type-wheel J to be again turned to the extent of three teeth more, or until the number 9, which is the result, appears opposite the slot in the casing.

If subtraction, instead of addition, were to be performed, the number 6 would be set up in the same way on the cylinder and type-wheel; but in the second stage of the operation the said cylinder would be turned in the reverse direction, as indicated by the arrow 3, to the extent of a complete revolution, and the result in such case would be to turn the type-wheel J in a reverse direction to the extent of three teeth, which would bring the number 3 opposite the slot in the casing.

To multiply 6 by 3, which is equivalent to adding three sixes together, the multiplicand 6 is set up on the cylinder by adjusting the knob $g$ to the graduation $b$ of the units-slot $x$, and thus advancing six teeth $h$, after which the cylinder is turned three times in the direction of the arrow 2, the result being indicated by the first and second type-wheels, J and $J^1$, Fig. 4, while the units type-wheel N, which is turned to the extent of one tooth for every single revolution of the cylinder through the medium of the lever Q, will be turned to the extent of three teeth, and the number 3 on the same, which is the multiplier, will appear through the slot in the casing.

In the above operation one of the carrying-teeth $i$ on the cylinder is brought into play to effect an adjustment of the second type-wheel, $J^1$, to the extent of one tooth, in order to expose its number 1 as part of the result 18, This takes place on the second revolution of the cylinder, and just as the number 9 of the first type-wheel is brought opposite the slot, the triangular projection $m$ of the said wheel then striking the end of its sliding rod M, Fig. 3, and forcing the same toward the cylinder and into the path of the carrying-tooth $i$ of the units row, the said tooth striking the beveled head $p'$ of the rod, and being adjusted laterally by the same, and thus held until it has turned the second intermediate wheel, G, and second or tens type-wheel, $J^1$, to the extent of one tooth. When this has been effected the rod M is pushed back by one of the double-inclined projections $j$ of the cylinder, and the tooth $i$ springs to its original position between the first and second wheels G. On the third revolution of the cylinder the result is completed by an adjustment of the units type-wheel only by means of the teeth $h$.

In division, which is the reverse of multiplication, the numbers would be set up and the cylinder simply turned in a reverse direction, as indicated by the arrow 3, the projections $j$ and heads of the rods M being inclined in both directions, and carrying-teeth $i^1$ being provided in order to permit such reverse movement.

The machine would be of little service in making such simple calculations as those which I have given in order to illustrate its operation; but it is of especial service in making complicated calculations, such as multiplying one long row of figures by another, as by its aid such calculating can be performed with accuracy and rapidity. It is in such calculations that it becomes necessary to shift the cylinder on the shaft, in order to pass from units to tens, and thence to hundreds, &c. For instance, in multiplying 483 by 561, the number 483 would be set up on the cylinder by an adjustment of the knobs $g$ to the graduations 4, 8, and 3 of the hundreds, tens, and units slots $x^2$, $x^1$, and $x$ of the cylinder, the type-wheels being all set at zero. The first operation would be to give the cylinder a single turn, which would set up the number 483 on the type-wheels J, and the number 1 on the units type-wheel N. The next step would be to shift the cylinder one place on its shaft D, so as to bring its units-teeth $h$ opposite the tens type-wheel $J^1$, its tens-teeth opposite the hundreds type-wheel, and its hundreds-teeth opposite the thousands type-wheel. This having been accomplished, the cylinder would be turned six times in the same direction as before, when the result on the type-wheels would indicate a further multiplication of 483 by 60, while the number 61 would be registered on the lower type-wheels N and N', Fig. 5. The remaining step would be to shift the cylinder another place on its shaft, so as to bring the units row of teeth $h$ opposite the hundreds type-wheel $J^2$, and then to turn the said cylinder five times in the same direction as before, which would be equivalent to multiplying the number 843 by 500, and this result added to that already obtained will be indicated by the type-wheels J, giving the total result 270,936, the multiplier 561 being at the same time registered on the lower type-wheels N.

It will be understood that but one lever, Q, is used to adjust the several type-wheels N, the said lever being carried from one type wheel to the next when the cylinder is shifted upon its shaft.

Other calculations, such as extracting the square and cube root, may be readily made by the machine; but the principal object of the latter is to enable complex calculations in multiplication and division to be rapidly and accurately made.

After having made a calculation the figures may be rubbed out, or, in other words, the type-wheels restored to the position of zero, by depressing the crank $n^1$, so as to adjust the arms $n$ and $n^2$ to the position indicated by dotted lines, and unlock the shaft T, and by then turning the crank $T^1$ of the shaft. This will cause all of the said type-wheels of both sets, through the medium of the gearing described, to be turned until their projections $m$ and $m'$ strike the arms $n$ and $n^2$ of the rock-shaft U, which will only occur when the said type-wheels have arrived at the zero position. To facilitate this rubbing-out operation, the spring-arms L, with their rollers, may, if desired, be elevated from the wheels G by depressing the crank $i^1$.

As it may often be desirable to preserve the results of the calculations made by the machine, I have combined a ribbon-printing device with the same, consisting of a frame, V, hinged to the frame of the machine at $t$, and having toggle-joint arms W arranged to embrace the shaft I of the type-wheels, and by means of which the required pressure against the exposed numbers on the latter is obtained. The ribbon is wound upon rollers $u$ and $u'$, and the paper upon a roller, $v$.

If desired, the ribbons may be dispensed with, and perforations be made in the paper by specially-constructed type secured to or forming part of the wheels.

I claim as my invention—

1. A calculating-machine in which a series of toothed type-wheels are combined with a cylinder carrying teeth, which admit of being adjusted to revolve, or partly revolve, any one or more of said wheels, substantially as set forth.

2. In a calculating-machine, the combination, with a series of toothed type-wheels, of a toothed cylinder, E, capable of being rotated in either direction, and of being adjusted longitudinally in respect to the said type-wheels, as specified.

3. The cylinder E, provided with advancing and retracting teeth, and with adjusting mechanism for the same, controlled by knobs $g$, and having graduated slots $x$, so arranged that the position of the said knobs in the same will indicate the number of teeth advanced, all substantially as specified.

4. The combination, with the teeth $h$, of springs for adjusting the same in one direction, and of cam-like segments F, for adjusting them in the opposite direction, and for retaining them after adjustment, as specified, Fig. 3.

5. The carrying teeth $i$, hung to and arranged to be adjusted laterally on the cylinder, substantially as and for the purpose set forth.

6. The combination of the cylinder-shaft D, its cog or ratchet wheel $c$, and notched disk $c'$ with the anchor-lever $d$, acted on by a spring, all substantially as and for the purpose specified. (See Fig. 6.)

7. The combination of the cylinder, screw-shaft D, nut $s$, and a locking device, whereby the cylinder and nut may be rotated with the shaft, or retained while the shaft rotates, all as and for the purpose set forth.

8. The combination, substantially as described, of the toothed cylinder E, the series of intermediate toothed wheels G, and the series of toothed type-wheels J.

9. The combination, substantially as described, of the cylinder E, its eccentric $Q^2$, and lever Q with the series of toothed type-wheels N, Fig. 7.

10. The disks J, having a frictional attachment to the shaft, in combination with arms or stops, adjustable, so as to arrest the movement of one or more wheels while the shaft is turning, all as set forth.

11. The combination of the cylinder, series of carrying-teeth $i$, and arms M, operated by type-wheels J, and adjusting the said carriers, as set forth.

12. The rods M, adapted to and arranged to slide in slots formed for their reception in the fixed shaft H, between the wheels G.

13. The combination of the said rods M and their double-inclined heads $p'$ with the laterally-adjustable teeth $i$ and $i^1$ of the cylinder.

14. The combination, substantially as described, of the said rods M with the double-inclined projections $j$ of the cylinder.

15. The combination of the said sliding rods M with the projections $m$ of the type-wheels J.

16. The wheels J, provided with triangular projections $m$, in combination with the stop $n$ and arms M, substantially as and for the purpose set forth.

17. The type-wheels J and N, hung loosely to their shafts, and provided with springs arranged to bear against the recessed edges of disks keyed to the said shafts, all substantially as and for the purpose specified.

18. The combination of the shaft U and its arms $n$ with the projections $m$ of the type-wheels J.

19. The combination of the shaft U and its arms $n^2$ with the projections $m'$ of the type-wheels N.

In testimony whereof I have signed my name to this specification in the presence of two subscribing witnesses.

F. S. BALDWIN.

Witnesses:
  WM. A. STEEL,
  HARRY SMITH.